(12) United States Patent
Gray et al.

(10) Patent No.: US 9,010,712 B2
(45) Date of Patent: Apr. 21, 2015

(54) SLIDING EASY ENTRY RELEASE MECHANISM WITH REST IN FULL REAR POSITION

(75) Inventors: Donald W Gray, Highland, MI (US); Jeffrey P Carroll, West Bloomfield, MI (US); Ashok K Sahi, West Bloomfield, MI (US)

(73) Assignee: Magna Seating Inc., Aurora, Ontario (CA)

( * ) Notice: Subject to any disclaimer, the term of this patent is extended or adjusted under 35 U.S.C. 154(b) by 427 days.

(21) Appl. No.: 13/395,553

(22) PCT Filed: Oct. 8, 2010

(86) PCT No.: PCT/CA2010/001623
§ 371 (c)(1),
(2), (4) Date: Mar. 12, 2012

(87) PCT Pub. No.: WO2011/041911
PCT Pub. Date: Apr. 14, 2011

(65) Prior Publication Data
US 2012/0168595 A1    Jul. 5, 2012

Related U.S. Application Data

(60) Provisional application No. 61/249,777, filed on Oct. 8, 2009.

(51) Int. Cl.
*F16M 13/00* (2006.01)
*B60N 2/12* (2006.01)
*B60N 2/08* (2006.01)

(52) U.S. Cl.
CPC ............... *B60N 2/12* (2013.01); *B60N 2/0818* (2013.01); *B60N 2/085* (2013.01)

(58) Field of Classification Search
CPC ...... B60N 2/07; B60N 2/0722; B60N 2/0715; B60N 2/0705; B60N 2/0825
USPC ............... 248/424, 425, 429, 430; 297/65.13, 297/65.15, 344.11
See application file for complete search history.

(56) References Cited

U.S. PATENT DOCUMENTS 5,688,026 A * 11/1997 Reubeuze et al. ............ 297/341
5,695,247 A * 12/1997 Premji ........................... 297/341
5,800,015 A *  9/1998 Tsuchiya et al. .............. 297/331
5,927,809 A *  7/1999 Tame ............................. 297/341

(Continued)

FOREIGN PATENT DOCUMENTS

EP          2030832      3/2009
WO       2010066053     6/2010

*Primary Examiner* — Nkeisha Smith
(74) *Attorney, Agent, or Firm* — Miller Canfield

(57) ABSTRACT

A seat track assembly for moving a seat assembly includes a fixed track and a movable track. A first slide member is slidably coupled to the movable track and slides between first and second positions. The first slide member slides from the first position to the second position in response to pivoting a seat back to a folded position thereby actuating a latch mechanism to an unlocking position and pivoting a hook lever to a raised position allowing movement of the seat assembly from a comfort range to an easy entry position. The first slide member slides from the second position to the first position in response to the first slide member engaging a rearward stop at a rearward end of the comfort range thereby actuating the latch mechanism to a locking position and pivoting the hook lever to lowered position.

13 Claims, 5 Drawing Sheets

(56) References Cited

U.S. PATENT DOCUMENTS

| | | | | |
|---|---|---|---|---|
| 6,098,946 A * | 8/2000 | Sechet et al. | ................... | 248/424 |
| 6,227,596 B1 * | 5/2001 | Foucault et al. | ............ | 296/65.13 |
| 6,439,531 B1 * | 8/2002 | Severini et al. | ................ | 248/423 |
| 6,505,805 B2 * | 1/2003 | Fuller | ............................ | 248/429 |
| 6,616,233 B1 * | 9/2003 | Debus et al. | ................... | 297/341 |
| 6,926,364 B2 | 8/2005 | Cooley et al. | | |
| 7,017,933 B2 | 3/2006 | Niimi et al. | | |
| 7,090,188 B2 * | 8/2006 | Severini et al. | ................ | 248/424 |
| 7,665,703 B2 * | 2/2010 | Tanaka | ............................ | 248/429 |
| 2010/0052390 A1 * | 3/2010 | Dagcioglu et al. | ............ | 297/324 |
| 2013/0278033 A1 * | 10/2013 | Tame et al. | ................. | 297/344.1 |

* cited by examiner

SLIDING EASY ENTRY RELEASE MECHANISM WITH REST IN FULL REAR POSITION

CROSS-REFERENCE TO RELATED APPLICATIONS

This application is a national phase application and claims priority to and all the benefits of, under 35 USC 371, of PCT/CA2010/001623, filed on Oct. 8, 2010, which in turn claims the priority of U.S. Provisional Application No. 61/249,777, filed on Oct. 8, 2009 and entitled "Sliding Easy Entry Release Mechanism with Rest in Full Rear Full Position". All applications are incorporated herein by reference in their entireties.

BACKGROUND OF THE INVENTION

1. Field of the Invention

The invention relates to a seat track assembly for a motor vehicle seat. More particularly, the invention relates to a seat track assembly operable to an unlocked condition for moving a seat assembly to an easy entry position from within a predefined comfort range and upon return to a full rearward position the seat track assembly automatically resets to a locked condition.

2. Description of Related Art

Automotive vehicles include seat assemblies for supporting occupants within the vehicle. A typical seat assembly includes a seat cushion and a seat back operatively coupled to the seat cushion by a recliner mechanism allowing selective pivotal adjustment of the seat back relative to the seat cushion between a plurality of reclined seating positions. The seat back is also often movable to a forwardly inclined dump position to allow easier ingress and egress to a rear seat assembly or storage area located behind the seat assembly.

It is known in the automotive seating art to provide a seat track assembly that slidably interconnects the seat assembly to a floor of the vehicle. The seat track assembly provides forward and rearward movement of the seat assembly along the floor to allow an occupant to select a particular fore/aft seating position. The seat track assembly typically includes a lower or fixed track mounted to the floor of the vehicle and an upper or movable track slidably engaging the fixed track and mounted to a bottom surface of the seat cushion. A locking mechanism is operatively coupled between the fixed and movable tracks and selectively locks the movable track relative to the fixed track.

It is also known in the automotive seating art to operatively couple the seat back and the locking mechanism. When the seat back is moved to the dump position, the locking mechanism is released or unlocked and the seat assembly is biased forward along the fixed track. The seat assembly, with the seat back in the dump position, moves forward to a foremost or easy entry position to allow even easier ingress and egress to the rear seat assembly or storage area. The seat assembly is returned rearward when access to the rear seat assembly or storage area is no longer necessary.

It is desirable to provide a seat track assembly that allows a seat assembly to be positioned at any one of a plurality of fore/aft seating positions within a predefined comfort range. It is also desirable to provide a seat track assembly that allows movement of the seat assembly to an easy entry position outside of the comfort range in response to pivoting a seat back to a dump position and automatically resets in response to returning the seat assembly to a full rearward position.

SUMMARY OF THE INVENTION

According to one aspect of the invention, a seat track assembly includes a fixed track fixedly secured to a vehicle floor and a movable track fixedly secured to a seat assembly and slidably coupled to the fixed track. The fixed track includes a forward stop and a rearward stop that define a comfort range of travel of the seat assembly. A latch mechanism is operable between a locking position that prevents sliding movement of the movable track and an unlocking position that allows sliding movement of the movable track. A hook lever is pivotally coupled to the movable track. The hook lever pivots between a lowered position engageable with the forward stop at a forward end of the comfort range and a raised position that prevents engagement of the hook lever with the forward stop thereby allowing movement of the seat assembly to an easy entry position. A first slide member is slidably coupled to the movable track. The first slide member slides between a first position wherein the hook lever is in the lowered position and the latch mechanism is operable between the locking and unlocking positions and a second position wherein the hook lever is in the raised position and the latch mechanism is in the unlocking position. The first slide member slides from the first position to the second position in response to pivoting a seat back to a folded position thereby actuating the latch mechanism to the unlocking position and pivoting the hook lever to the raised position to allow movement of the seat assembly to the easy entry position. The first slide member slides from the second position to the first position in response to the first slide member engaging the rearward stop at a rearward end of the comfort range thereby actuating the latch mechanism to the locking position and pivoting the hook lever to the lowered position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
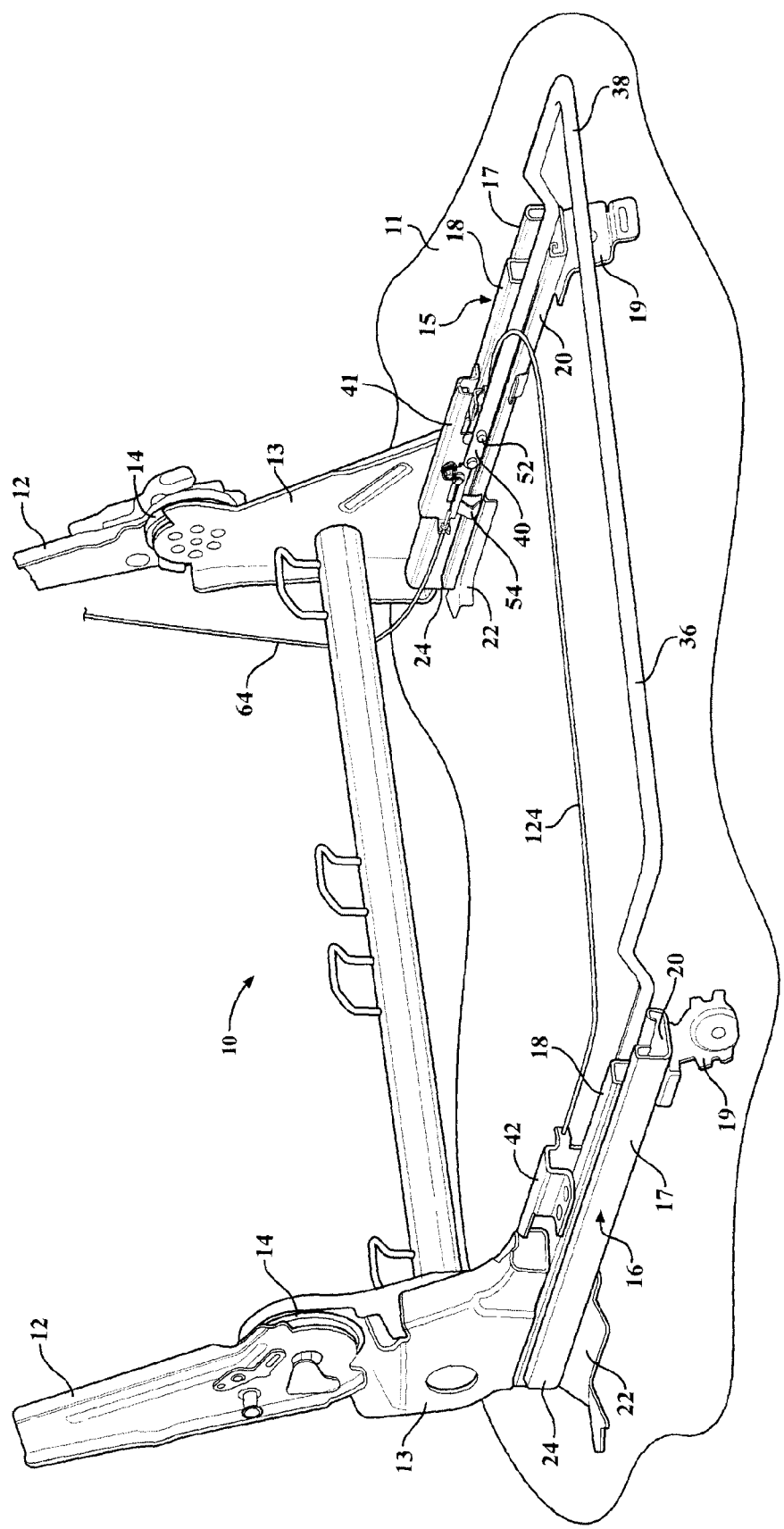
FIG. 1 is a perspective view of a pair of seat track assemblies according to one embodiment of the invention.

Referring to the Figures, a seat track mechanism is generally shown at 10. The seat track mechanism 10 slidably interconnects a seat assembly (not shown) to a floor 11 of an automotive vehicle. The seat track mechanism 10 allows selective forward and rearward adjustment of the seat assembly in a longitudinal direction along the floor 11. The seat assembly includes a seat back 12 operatively coupled to a seat cushion 13. As is well known in the vehicle seating art, the seat back 12 is operatively coupled to the seat cushion 13 by a pair of recliner mechanisms 14 to allow selective pivotal movement of the seat back 12 relative to the seat cushion 13 between an upright seating position and a forwardly inclined dump position.

The seat track mechanism 10 includes an inboard seat track assembly 15 and an outboard seat track assembly 16. Each of the inboard and outboard seat track assemblies 15, 16 include a lower fixed track 17 and an upper movable track 18. In the embodiment shown, each fixed track 17 is mounted to the floor 11 by a front bracket or riser 19 at a forward end 20 thereof and a rear bracket or riser 22 at a rearward end 24 thereof. Each movable track 18 is adapted to be fixedly secured to an underside of the seat cushion 13 and is slidably coupled to the fixed track 17 for longitudinal fore and aft sliding movement relative thereto. Thus, when the movable tracks 18 slide relative to the fixed tracks 17 the seat assembly moves therewith in the longitudinal direction. The inboard and outboard seat track assemblies 15, 16 are designated as such for reference purposes only. It is appreciated that in an alternative embodiment, the seat track assembly 15 designated as the inboard seat track assembly could be the outboard seat track assembly and the seat track assembly 16 designated as the outboard seat track assembly could be the inboard seat track assembly, without varying from the scope of the invention.

Figure 2:
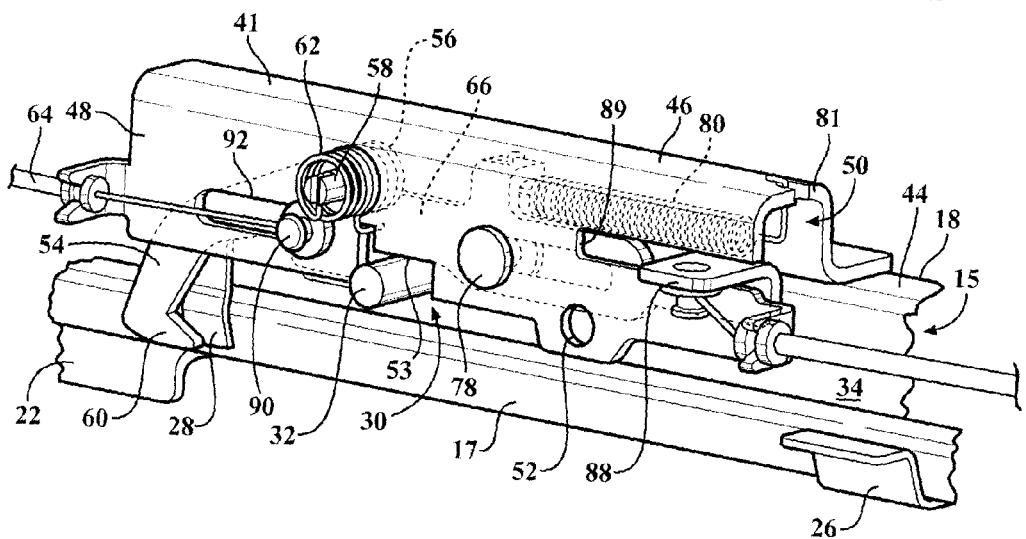
FIG. 2 is a fragmentary, perspective view of an inboard seat track assembly.

Referring to the inboard seat track assembly 15, shown in FIG. 2, a forward stop 26 is fixedly secured to the fixed track 17 at a position between the forward and rearward ends 20, 24 thereof. The forward stop 26 is disposed generally toward the forward end 20 thereof. A rearward stop 28 is fixedly secured to the fixed track 17 between the rearward end 24 thereof and the forward stop 26. The rearward stop 28 is disposed generally adjacent the rearward end 24 of the fixed track 17. The forward and rearward stops 26, 28 define a comfort range of travel of the seat assembly, as is described below in detail.

Each of the inboard and outboard seat track assemblies 15, 16 include a latch mechanism, generally shown at 30 for selectively locking the seat assembly in any one of a plurality of fore/aft seating positions within the comfort range. As is well known in the art, the latch mechanism 30 is operatively coupled to the movable track 18 and is movable between a locking position engaged with the fixed track 17 to prevent forward and rearward sliding movement of the movable track 18 and an unlocking position disengaged with the fixed track 17 to allow forward and rearward sliding movement of the movable track 18. The latch mechanism 30 includes a shaft 32 extending in a lateral direction through a slot (not shown) in a side wall 34 of the movable track 18. The slot allows the shaft 32, and therefore the latch mechanism 30, to move upwardly and downwardly between the locking and unlocking positions. The latch mechanism 30 is biased upwardly to the locking position. Pushing the shaft 32 downwardly moves the latch mechanism 30 to the unlocking position.

A seat track adjustment handle or towel bar 36 is used for actuating the latch mechanisms 30 from the locking position to the unlocking position to allow adjustment of the seat assembly between the plurality of fore/aft seating positions within the comfort range. The towel bar 36 extends forwardly from underneath the seat cushion 13, as is well known in the art. More specifically, the towel bar 36 extends between a first end 38 adjacent a front end of the seat cushion 13 and a second end 40 pivotally coupled to the shaft 32 of the latch mechanism 30. The towel bar 36 is also pivotally coupled to an inboard mounting bracket 41 and an outboard mounting bracket 42. Each of the inboard and outboard mounting brackets 41, 42 is fixedly secured to an upper surface 44 of the respective movable track 18 and includes a top wall 46 and a side wall 48. The top wall 46 and side wall 48 are configured to define an inner space 50 adjacent the side wall 34 of the respective movable track 18. The towel bar 36 is pivotally coupled between the first and second ends 38, 40 to the side wall 48 of the inboard and outboard mounting brackets 41, 42 at pivot 52. Thus, lifting the first end 38 of the towel bar 36 causes the second end 40 to move downwardly, thereby moving the latch mechanisms 30 downwardly from the locking position to the unlocking position allowing longitudinal sliding movement of the movable track 18 relative to the fixed track 17. The side wall 48 of each of the inboard and outboard mounting brackets 41, 42 include a recessed portion 53, shown in FIGS. 2 and 3, to allow the shaft 32 to move upwardly to return the respective latch mechanism 30 to the unlocking position.

Referring to the inboard seat track assembly 15 in FIG. 2, a hook lever 54 is disposed within the inner space 50 defined by the inboard mounting bracket 41 and is pivotally coupled to the side wall 48. The hook lever 54 extends between a proximal end 56 pivotally coupled to the side wall 48 at pivot 58 and a free distal end 60. A spring 62 is disposed about the pivot 58 to bias the hook lever 54 to a lowered position, shown in FIGS. 2 and 4. In the lowered position, the hook lever 54 will engage the forward stop 26 to prevent sliding adjustment of the seat assembly to a position forward beyond the comfort range. In order to move the seat assembly to a position forward beyond the comfort range, to an easy entry position for example, the hook lever 54 is pivoted to a raised position, shown in FIG. 5. In the raised position, the hook lever 54 does not engage the forward stop 26 and the seat assembly is slidably movable to the easy entry position at the forward limit of travel of the seat track mechanism 10. The hook lever 54 is pivoted to the raised position by pivoting the seat back 12 to the dump position.

Figure 6:
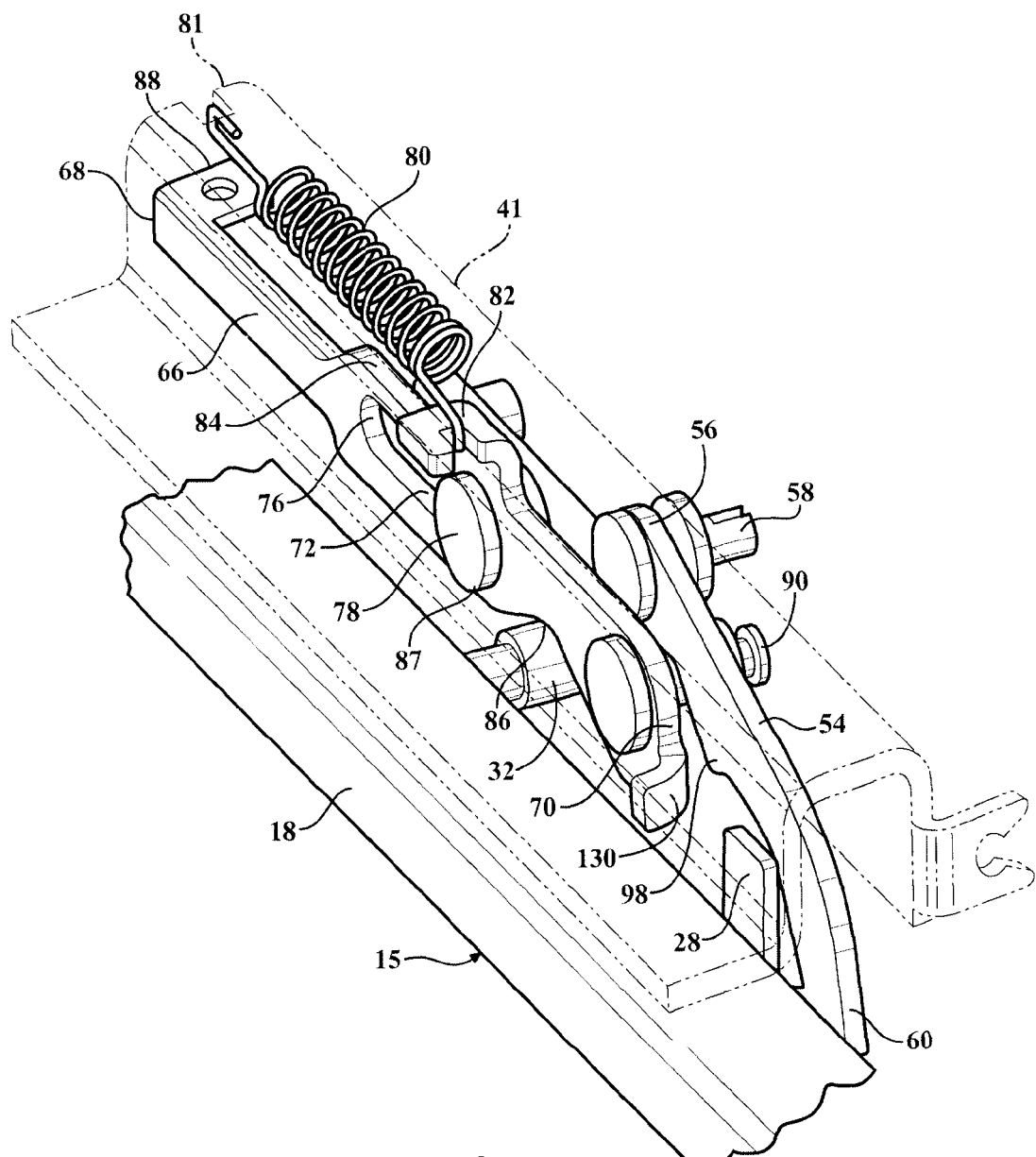
FIG. 6 is an inner perspective view of the inboard seat track assembly with the latch mechanism in the locking position and the hook lever in the lowered position.
Figure 7:
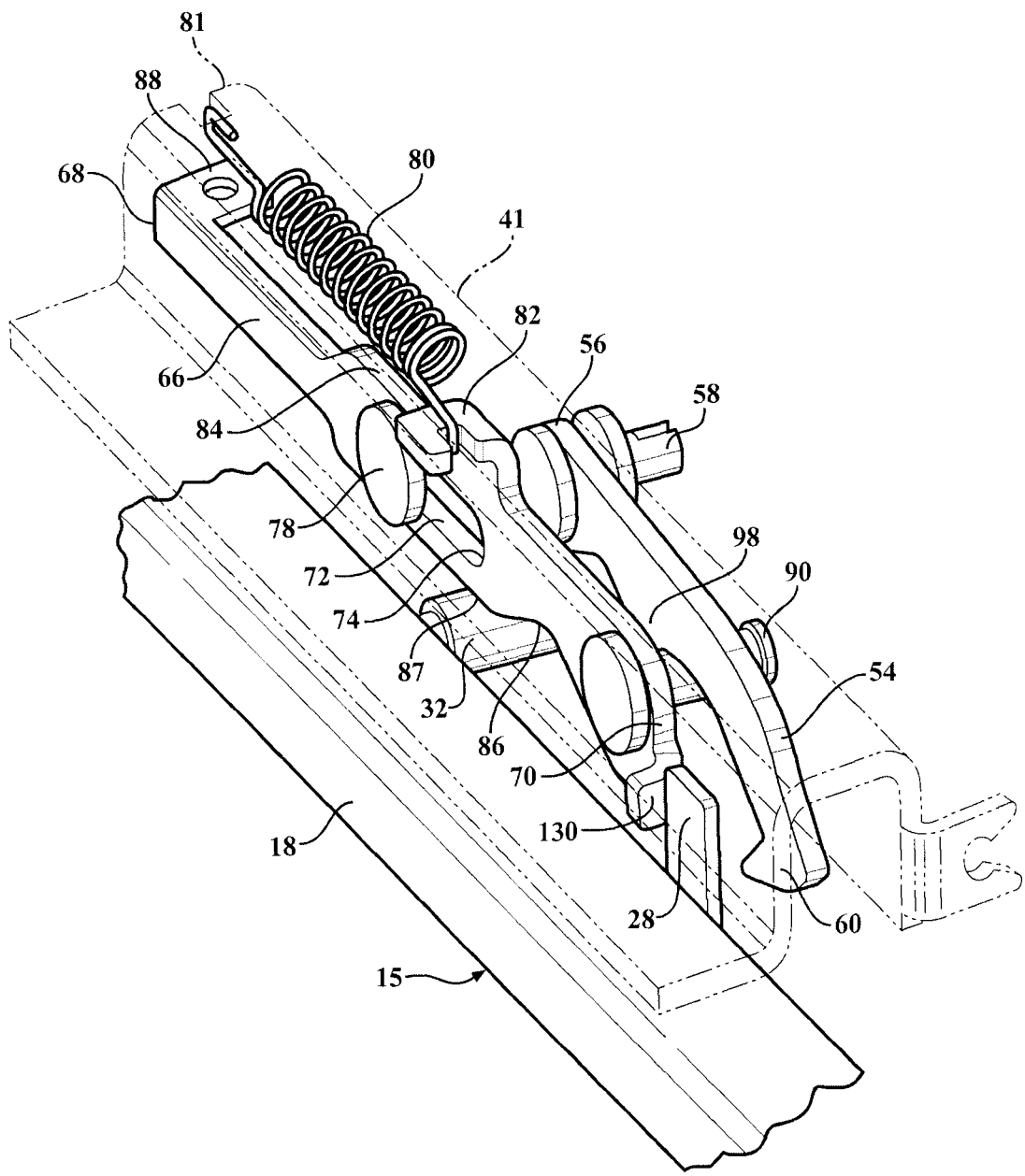
FIG. 7 is an inner perspective view of the inboard seat track assembly with the latch mechanism in the unlocking position and the hook lever in the raised position.

A first Bowden-type cable 64 is operatively coupled between the seat back 12 and a first slide member 66 slidably coupled to the inboard mounting bracket 41. The first slide member 66 is disposed within the inner space 50 defined by the inboard mounting bracket 41 and is slidably coupled to the side wall 48. The first slide member 66 extends between a front end 68 and a rear end 70 and includes a slot 72 extending in the longitudinal direction between a first end 74 and a second end 76, as shown in FIGS. 6 and 7. The first end 74 of the slot 72 is disposed toward the rear end 70 of the first slide member 66 and the second end 76 of the slot 72 is disposed toward the front end 68 of the first slide member 66. A guide pin 78 fixedly secured to the side wall 48 extends in the lateral direction toward the side wall 34 of the movable track 18 and is disposed in the slot 72. The first slide member 66 moves between a first position, shown in FIGS. 2 and 6, wherein the guide pin 78 is disposed at the first end 74 of the slot 72 and a second position, shown in FIG. 7, wherein the guide pin 78 is disposed at the second end 76 of the slot 72. An extension spring 80 coupled between a forward end 81 of the inboard mounting bracket 41 and a tab 82 on an upper edge 84 of the first slide member 66 biases the first slide member 66 to the first position. The first slide member 66 also includes a recess 86 on a lower edge 87 thereof. With the first slide member 66 in the first position, the shaft 32 of the latch mechanism 30 is aligned with the recess 86 such that the latch mechanism 30 is in the locking position, as shown in FIGS. 2 and 6. Moving the first slide member 66 rearward to the second position causes the lower edge 87 of the first slide member 66 to engage the shaft 32 of the latch mechanism 30 and forces the latch mechanism 30 downwardly from the locking position to the unlocking position, as shown in FIG. 7. The first slide member 66 further includes an arm 88 at the front end 68 thereof, the purpose of which is described below in detail. The arm 88 extends in the lateral direction away from the movable track 18 and through an open-ended slot 89 in the side wall 48 at the forward end 81 of the inboard mounting bracket 41.

Figure 4:
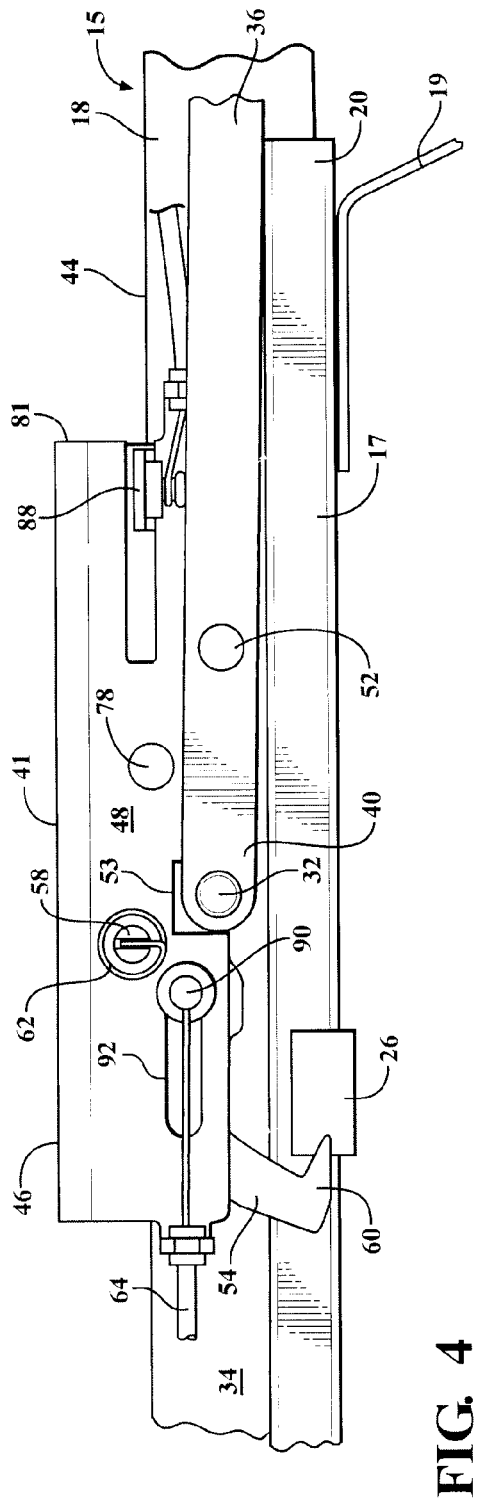
FIG. 4 is a side view of the inboard seat track assembly with a latch mechanism in a locking position and a hook lever in a lowered position.
Figure 5:
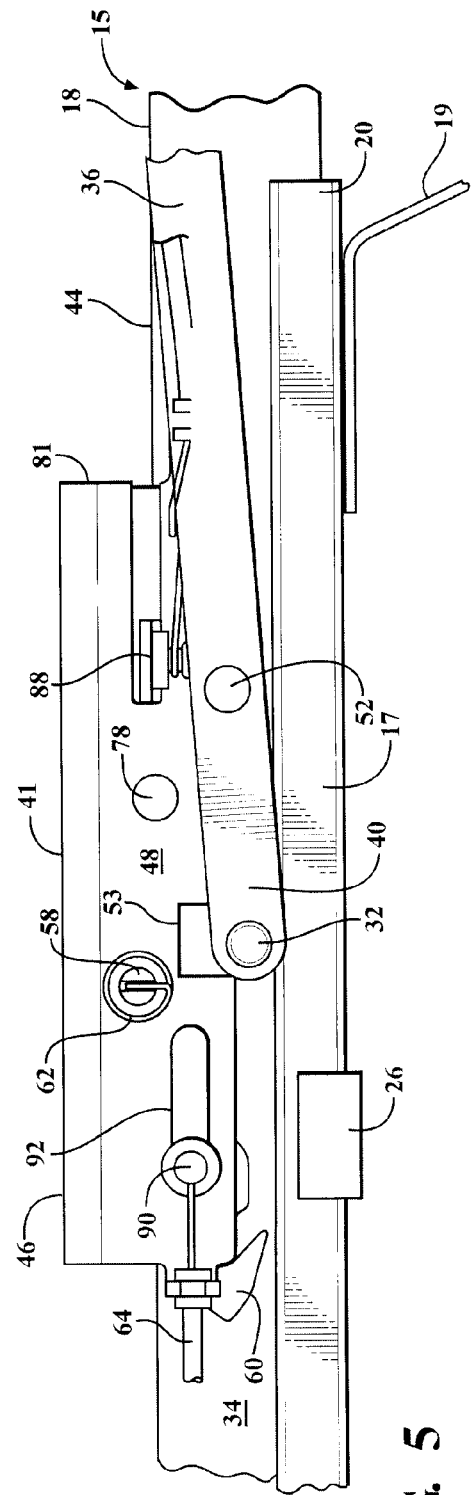
FIG. 5 is a side view of the inboard seat track assembly with the latch mechanism in an unlocking position and the hook lever in a raised position.

A cable pin 90 is fixedly secured to the first slide member 66 adjacent the rear end 70 thereof. The cable pin 90 extends in the lateral direction away from the movable track 18 and through a slot 92 in the side wall 48 of the inboard mounting bracket 41. The slot 92 extends in the longitudinal direction. The first cable 64 is operatively coupled between the seat back 12 and the cable pin 90 to move the first slide member 66 from the first position to the second position in response to pivoting the seat back 12 to the dump position. As the first slide member 66 moves from the first position to the second position the cable pin 90 moves therewith. With the first slide member 66 in the first position, the hook lever 54 is in the lowered position, as shown in FIGS. 2, 4 and 6. Moving the first slide member 66 rearward to the second position moves the cable pin 90 rearward, which engages the hook lever 54 and pivots the hook lever 54 from the lowered position to the raised position, as shown in FIGS. 5 and 7. As the hook lever 54 pivots from the lowered position to the raised position, a detent 98 on the hook lever 54 passes over the cable pin 90, to a front side thereof, which prevents the extension spring 80 from automatically returning the first slide member 66 to the first position.

Figure 3:
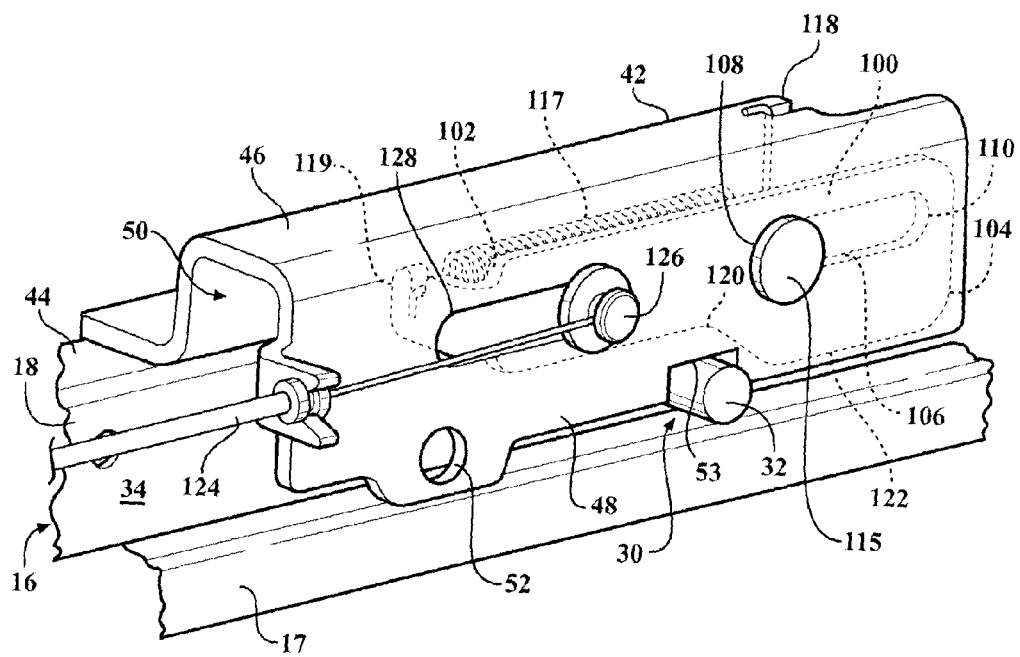
FIG. 3 is a fragmentary, perspective view of an outboard seat track assembly.

Referring to the outboard seat track assembly 16 in FIG. 3, a second slide member 100 is slidably coupled to the outboard mounting bracket 42. The second slide member 100 is disposed within the inner space 50 defined by the outboard mounting bracket 42 and is slidably coupled to the side wall 48. The second slide member 100 extends between a front end 102 and a rear end 104 and includes a slot 106 extending in the longitudinal direction between a first end 108 and a second end 110. The first end 108 of the slot 102 is disposed toward the front end 102 of the second slide member 100 and the second end 110 of the slot 102 is disposed toward the rear end 104 of the second slide member 100. A guide pin 115 fixedly secured to the side wall 48 extends in the lateral direction toward the side wall 34 of the movable track 18 and is disposed in the slot 106. The second slide member 100 moves between a first position, shown in FIG. 3, wherein the guide pin 115 is disposed at the first end 108 of the slot 106 and a second position wherein the guide pin 115 is disposed at the second end 110 of the slot 106. An extension spring 117 coupled to a rearward end 118 of the outboard mounting bracket 42 and a tab 119 at the front end 102 of the second slide member 100 biases the second slide member 100 to the first position. The second slide member 100 also includes a recess 120 on a lower edge 122 thereof. With the second slide member 100 in the first position, the shaft 32 of the latch mechanism 30 is aligned with the recess 120 such that the latch mechanism 30 is in the locking position. Moving the second slide member 100 forward to the second position causes the lower edge 122 of the second slide member 100 to engage the shaft 32 of the latch mechanism 30 and forces the latch mechanism 30 downwardly from the locking position to the unlocking position.

A second Bowden-type cable 124 is operatively coupled between the arm 88 on the first slide member 66 and a cable pin 126 fixedly secured to the second slide member 100 adjacent the front end 102 thereof. The cable pin 126 extends in the lateral direction away from the movable track 18 and through a slot 128 in the side wall 48 of the outboard mounting bracket 42. The slot 128 extends in the longitudinal direction. The second cable 124 moves the second slide member 100 from the first position to the second position in response to movement of the first slide member 66 from the first position to the second position. Thus, with the first and second slide members 66, 100 in the second position, the latch mechanisms 30 are in the unlocking position and the hook lever 54 is in the raised position such that the seat assembly is slidably movable to the easy entry position.

The rear end 70 of the first slide member 66 includes a tab 130. When the seat assembly is returned from the easy entry position to a rearmost seating position within the comfort range, the tab 130 engages the rearward stop 28, which urges the first slide member 66 forward toward the first position. As the first slide member 66 moves forward, the detent 98 on the hook lever 54 passes over the cable pin 90, to a rear side thereof, which allows the extension spring 80 to automatically return the first slide member 66 forward to the first position. As the first slide member 66 returns to the first position, the hook lever 54 pivots from the raised position to the lowered position and the recess 86 on the lower edge 87 of the first slide member 66 re-aligns with the shaft 32 of the latch mechanism 30 such that the latch mechanism 30 returns to the locking position. At the same time, the second cable 124 is released and the extension spring 117 automatically returns the second slide member 100 rearward to the first position. As the second slide member 100 returns to the first position, the recess 120 on the lower edge 122 of the second slide member 100 re-aligns with the shaft 32 of the latch mechanism 30 such that the latch mechanism 30 returns to the locking position.

In operation, the seat assembly can be moved between any of the plurality of fore/aft seating positions within the comfort range by lifting the towel bar 36. Lifting the first end 38 of the towel bar 36 causes the second end 40 to move downwardly, thereby actuating the latch mechanisms 30 from the locking position to the unlocking position. With the latch mechanisms 30 in the unlocking position the movable track 18 is slidably movable relative to the fixed track 17 to allow adjustment of the seat assembly between the plurality of fore/aft seating positions within the comfort range. Once the desired fore/aft seating position is selected, the towel bar 36 is released and the latch mechanisms 30 automatically return to the locking position.

In order to move the seat assembly from any one of the fore/aft seating positions to the easy entry position, the seat back 12 is pivoted to the dump position. Pivoting the seat back 12 to the dump position pulls the first cable 64 which moves the first slide member 66 rearward from the first position to the second position. As the first slide member 66 moves rearward, the lower edge 87 of the first slide member 66 engages the shaft 32 of the latch mechanism 30 and forces the latch mechanism 30 of the inboard seat track assembly 15 downwardly to the unlocking position. At the same time, the cable pin 90 engages the hook lever 54 and pivots the hook lever 54 from the lowered position to the raised position. As the cable pin 90 pivots the hook lever 54 from the lowered position to the raised position, the detent 98 passes over to the front side of the cable pin 90 to maintain the first slide member 66 in the second position. In response to the first slide member 66 moving rearward to the second position, the second cable 124 pulls the second slide member 100 forward to the second position. As the second slide member 100 moves forward, the lower edge 122 of the second slide member 100 engages the shaft 32 of the latch mechanism 30 and forces the latch mechanism 30 of the outboard seat track assembly 16 downwardly to the unlocking position. With the latch mechanisms 30 in the unlocking position and the hook lever 54 in the raised position the movable tracks 18 slide forward along the fixed tracks 17 until the seat assembly is in the easy entry position. It is appreciated that the movable tracks 18 may be biased relative to the fixed tracks 17 to automatically move the seat assembly to the easy entry position or the seat assembly may be moved manually to the easy entry position, without varying from the scope of the invention.

To return the seat assembly from the easy entry position to one of the fore/aft seating positions within the comfort range, the seat assembly is slidably moved rearward to the rearmost seating position. As the seat assembly reaches the rearmost seating position, the tab 130 on the rear end 70 of the first slide member 66 engages the rearward stop 28, which urges the first slide member 66 forward toward the first position. As the first slide member 66 moves forward, the detent 98 passes over to the rear side of the cable pin 90. Once the detent 98 passes over to the rear side of the cable pin 90 the extension spring 80 can return the first slide member 66 to the first position. As the first slide member 66 moves forward, the hook lever 54 pivots from the raised position to the lowered position and the recess 86 on the lower edge 87 of the first slide member 66 re-aligns with the shaft 32 of the latch mechanism 30 allowing the latch mechanism 30 of the inboard seat track assembly 15 to return to the locking position. In response to the first slide member 66 moving forward to the first position, the second cable 124 is released and the extension spring 117 pulls the second slide member 100 rearward to the first position. As the second slide member 100 moves rearward, the recess 120 on the lower edge 122 of the second slide member 100 re-aligns with the shaft 32 of the latch mechanism 30 allowing the latch mechanism 30 of the outboard seat track assembly 16 to return to the locking position. The towel bar 36 can once again be lifted to adjust the seat assembly to any of the plurality of fore/aft seating positions within the comfort range.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A seat track assembly for moving a seat assembly having a seat back forward and rearward along a floor of a motor vehicle, said seat track assembly comprising:
a fixed track adapted to be fixedly secured to the floor, said fixed track including a forward stop and a rearward stop, said forward and rearward stops defining a comfort range of travel of the seat assembly;
a movable track adapted to be fixedly secured to the seat assembly and slidably coupled to said fixed track;
a latch mechanism operable between a locking position preventing sliding movement of said movable track and an unlocking position allowing sliding movement of said movable track; a hook lever pivotally coupled to said movable track, said hook lever pivotal between a lowered position engageable with said forward stop at a forward end of said comfort range and a raised position preventing engagement of said hook lever with said forward stop thereby allowing movement of the seat assembly to an easy entry position; and
a first slide member slidably coupled to said movable track, said first slide member slidable between a first position with said hook lever in said lowered position and said latch mechanism operable between said locking and unlocking positions and a second position with said hook lever in said raised position and said latch mechanism in said unlocking position, said first slide member includes a longitudinal slot extending between first and second ends for slidably receiving a first guide pin fixedly secured to said movable track for slidably guiding said first slide member between said first and second positions, wherein said first slide member slides from said first position to said second position in response to pivoting the seat back to a folded position thereby actuating said latch mechanism to said unlocking position and pivoting said hook lever to said raised position allowing movement of the seat assembly to said easy entry position, and wherein said first slide member slides from said second position to said first position in response to said first slide member engaging said rearward stop at a rearward end of said comfort range thereby actuating said latch mechanism to said locking position and pivoting said hook lever to said lowered position.

2. A seat track assembly as set forth in claim 1 further including a second slide member slidably coupled to said movable track between a first position with said latch mechanism in said locking position and a second position actuating said latch mechanism to said unlocking position.

3. A seat track assembly as set forth in claim 2 further including an inboard seat track assembly having a movable track slidably coupled to a fixed track and an outboard seat assembly having a movable track slidably coupled to a fixed track and spaced parallel to said inboard track assembly.

4. A seat track assembly as set forth in claim 3 wherein said first slide member is operatively coupled to one of said inboard and outboard seat track assembly and said second slide member is operatively coupled to the other of said inboard and outboard seat track assembly.

5. A seat track assembly as set forth in claim 4 wherein said second slide member is operatively coupled to said first slide member for sliding movement between said first and second positions in response to sliding movement of said first slide member between said first and second positions, respectively.

6. A seat track assembly as set forth in claim 5 wherein said first slide member includes cable pin projecting therefrom for engaging said hook lever and pivoting said hook lever between said lowered position and said raised position in response to sliding movement between said first position and said second position.

7. A seat track assembly as set forth in claim 6 further including a first extension spring extending between a first end connected to said first slide member and a second end connected to said movable track for biasing said first slide member to said first position.

8. A seat track assembly as set forth in claim 7 wherein said hook lever includes a lower detent for engagement with said cable pin to guide said hook lever to said raised position in response to sliding movement of said first slide member to said second position and maintain said hook lever in said raised position.

9. A seat track assembly as set forth in claim 8 wherein said second slide member includes a longitudinal slot extending between first and second ends for slidably receiving a second guide pin fixedly secured to said movable track for slidably guiding said second slide member between said first and second positions.

10. A seat track assembly as set forth in claim 9 further including a second extension spring extending between a first end connected to said second slide member and a second end connected to said moveable track for biasing said second slide member to said first position.

11. A seat track assembly as set forth in claim 10 further include a first cable extending between a first end adapted to be connected to the seat back and a second end connected to said first slide member for automatically sliding said first slide member between said first and second positions in response to pivotal movement of the seat back to the folded position.

12. A seat track assembly as set forth in claim 11 further including a second cable extending between a first end connected to first slide member and a second end connected to said second slide member for automatically sliding said second slide member between said first and second positions in response to sliding movement of said first slide member between said first and second positions.

13. A seat track assembly as set forth in claim 12 further including a towel bar operably coupled to said latch mechanism for selectively actuating said latch mechanism between said locking and unlocking positions.

* * * * *